US011756263B2

(12) United States Patent
Wan et al.

(10) Patent No.: US 11,756,263 B2
(45) Date of Patent: Sep. 12, 2023

(54) BOX MODELING METHOD, APPARATUS, ROBOT PICKING SYSTEM, ELECTRONIC DEVICE AND MEDIUM

(71) Applicant: BEIJING JINGDONG QIANSHI TECHNOLOGY CO., LTD., Beijing (CN)

(72) Inventors: Baocheng Wan, Beijing (CN); Weifeng Liu, Beijing (CN); Xu Liu, Beijing (CN); Kai Cao, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 18 days.

(21) Appl. No.: 17/424,924

(22) PCT Filed: Jan. 2, 2020

(86) PCT No.: PCT/CN2020/070027
§ 371 (c)(1),
(2) Date: Jul. 22, 2021

(87) PCT Pub. No.: WO2020/186894
PCT Pub. Date: Sep. 24, 2020

(65) Prior Publication Data
US 2022/0108524 A1 Apr. 7, 2022

(30) Foreign Application Priority Data

Mar. 19, 2019 (CN) .......................... 201910207568.3

(51) Int. Cl.
G06T 17/10 (2006.01)
G06T 15/06 (2011.01)
(Continued)

(52) U.S. Cl.
CPC ............ *G06T 17/10* (2013.01); *B25J 9/1687* (2013.01); *B25J 19/023* (2013.01); *G06F 17/11* (2013.01);
(Continued)

(58) Field of Classification Search
None
See application file for complete search history.

(56) References Cited

U.S. PATENT DOCUMENTS

2018/0111769 A1 4/2018 Yuvaraj et al.
2018/0143003 A1 5/2018 Clayton et al.
(Continued)

FOREIGN PATENT DOCUMENTS

CN 107247960 A 10/2017
CN 109035330 A 12/2018
(Continued)

OTHER PUBLICATIONS

Gao Qingji etc., Minimum elastic bounding box algorithm for dimension detection of 3D objects: a case of airline baggage measurement, IET Image Processing, IET, UK, Aug. 1, 2018.
(Continued)

*Primary Examiner* — Tize Ma
(74) *Attorney, Agent, or Firm* — Qinghong Xu

(57) ABSTRACT

A box modeling method and apparatus, a robot picking system, an electronic device and a medium, the method comprising: acquiring first 3D point cloud information of a box (S302); determining a first point of the box according to box parameters and the first 3D point cloud information (S304); performing a calculation to the first point and the first 3D point cloud information by using a ray method so as to generate a first minimum bounding rectangle (S306); and modeling the box according to the first minimum bounding rectangle and the box parameters (S308).

14 Claims, 11 Drawing Sheets

(51) Int. Cl.
  *G06T 7/60*  (2017.01)
  *G06T 7/70*  (2017.01)
  *G06F 17/11*  (2006.01)
  *G06F 17/17*  (2006.01)
  *B25J 9/16*  (2006.01)
  *B25J 19/02*  (2006.01)

(52) U.S. Cl.
  CPC ............... *G06F 17/17* (2013.01); *G06T 7/60* (2013.01); *G06T 7/70* (2017.01); *G06T 15/06* (2013.01); *G06T 2207/10028* (2013.01); *G06T 2210/12* (2013.01)

(56) References Cited

U.S. PATENT DOCUMENTS

2018/0253857 A1* 9/2018 Driegen .................... G06T 7/85
2020/0388004 A1* 12/2020 Zhang .................... G06T 7/337

FOREIGN PATENT DOCUMENTS

| CN | 109213202 A | 1/2019 |
| CN | 109410256 A | 3/2019 |

OTHER PUBLICATIONS

Extended European Search Report dated Nov. 29, 2022 of European Application No. 20772684.5.
International Search Report dated Apr. 1, 2020 for PCT International application No. PCT/CN2020/070027.

* cited by examiner

BOX MODELING METHOD, APPARATUS, ROBOT PICKING SYSTEM, ELECTRONIC DEVICE AND MEDIUM

CROSS REFERENCE

This disclosure is the U.S. national phase of PCT Application No. PCT/CN2020/070027, filed on Jan. 2, 2020, which is claims priority to Chinese Patent Application No. 201910207568.3, entitled "BOX MODELING METHOD, APPARATUS. ROBOT PICKING SYSTEM, ELECTRONIC DEVICE AND MEDIUM" and filed on Mar. 19, 2019, the entire contents of which are incorporated herein by reference.

TECHNICAL FIELD

The present disclosure relates to the technical field of warehouse logistics, and in particular, to a box modeling method, an apparatus, a robot picking system, electronic equipment and a computer readable medium.

BACKGROUND

In many scenarios of warehouse logistics, a tetragonal turnover box is needed to transport and sort goods, such as a task of picking in the turnover box by a robot. The turnover box runs on a conveyor belt and stops moving after reaching a designated location for picking the goods in the turnover box. Due to the bump of the conveyor belt and other factors during the movement, the position and orientation of the turnover box are not completely consistent each time being parked. In order to use the robot to take out the goods, it is necessary to accurately locate the goods, so as to avoid the collision between the robot and walls of the turnover box, and improve the applicability to the on-site environment and the reliability of the algorithm. It is necessary to dynamically establish a three-dimensional model of the turnover box.

Because the height of the entire conveyor belt is basically the same near the stopping position of the turnover box, and the geometric structure of the turnover box is known, a three-dimensional model of the turnover box can be established after the horizontal position of the turnover box is determined. Generally, the turnover box is located by determining its top, since a certain number of goods are stored. In the prior art, a point cloud at the top of the turnover box is usually obtained according to a point cloud of the entire scene, the height of the conveyor belt and parameters of the turnover box and so on, and then a minimum bounding rectangle (MBR) at the top of the turnover box is determined based on the point cloud at the top of the turnover box, thereby obtaining the three-dimensional model of the turnover box. However, in the prior art, the three-dimensional model of the turnover box established by the minimum bounding rectangle obtained from the point cloud at the top of the turnover box results in a larger geometric size of the three-dimensional model of the turnover box.

Therefore, a new box modeling method, apparatus, robot picking system, electronic equipment and computer readable medium are needed.

It should be understood that information disclosed in the background section above is only for enhancing the comprehension of the background of the present disclosure, and thus may comprise information that does not constitute prior art known to those ordinary skilled in the art.

SUMMARY

According to a first aspect of the present disclosure, there is provided a box modeling method applied in a robot picking system. The box modeling method may include: acquiring first three-dimensional point cloud information of a box; determining a first point of the box according to box parameters and the first three-dimensional point cloud information; generating a first minimum bounding rectangle by performing a calculation to the first point and the first three-dimensional point cloud information using a ray method; and modeling the box according to the first minimum bounding rectangle and the box parameters.

In an exemplary embodiment of the present disclosure, the determining the first point of the box according to the box parameters and the first three-dimensional point cloud information may include: based on the first three-dimensional point cloud information, determining second three-dimensional point cloud information at the top of the box according to a plane equation at the bottom of the box and a height of the box; calculating a second minimum bounding rectangle of the box according to the second three-dimensional point cloud information; and determining a first point of the box in the second minimum bounding rectangle.

In an exemplary embodiment of the present disclosure, the box modeling method may further include acquiring third three-dimensional point cloud information of the box in the case of the box is empty; determining fourth three-dimensional point cloud information at the bottom of the box according to the third three-dimensional point cloud information; and determining a plane equation at the bottom of the box according to the fourth three-dimensional point cloud information.

In an exemplary embodiment of the present disclosure, the determining the plane equation at the bottom of the box according to the fourth three-dimensional point cloud information may include: generating the plane equation at the bottom of the box by performing a calculation to the fourth three-dimensional point cloud information using a random sampling consensus algorithm and a least squares algorithm.

In an exemplary embodiment of the present disclosure, a distance between the first point and a center point of the second minimum bounding rectangle is within a threshold range.

In an exemplary embodiment of the present disclosure, the generating a first minimum bounding rectangle by performing the calculation to the first point and the first three-dimensional point cloud information using a ray method may include: determining an inner edge of the box by performing a calculation to the first point and the second three-dimensional point cloud information using the ray method; and generating the first minimum bounding rectangle by calculating a minimum bounding rectangle of the inner edge.

In an exemplary embodiment of the present disclosure, the modeling the box according to the first minimum bounding rectangle and the box parameters may include: determining a plurality of plane equations respectively corresponding to a plurality of faces of the box according to the first minimum bounding rectangle and the box parameters; and modeling the box according to the plurality of plane equations.

In an exemplary embodiment of the present disclosure, the acquiring first three-dimensional point cloud information of the box may include: acquiring the first three-dimensional point cloud information of the box, when it is determined that the box reaches a predetermined position.

In an exemplary embodiment of the present disclosure, the acquiring the first three-dimensional point cloud information of the box may include: acquiring the first three-dimensional point cloud information of the box using a three-dimensional camera.

According to a second aspect of the present disclosure, there is provided a box modeling apparatus applied in a robot picking system. The box modeling apparatus may include: a point cloud module configured to acquire first three-dimensional point cloud information of a box; a first point module configured to determine a first point of the box according to box parameters and the first three-dimensional point cloud information; a bounding rectangle module configured to generate a first minimum bounding rectangle by performing a calculation to the first point and the first three-dimensional point cloud information using a ray method; and a modeling module configured to model the box according to the first minimum bounding rectangle and the box parameters.

According to a third aspect of the present disclosure, there is provided a robot picking system. The robot picking system may include: a conveyor belt configured to convey a target to be conveyed to a predetermined position; a three-dimensional camera configured to acquire first three-dimensional point cloud information of the target to be conveyed at the predetermined position; a box configured to contain items to be picked; a controller configured to acquire the first three-dimensional point cloud information of the box; determine a first point of the box according to the box parameters and the first three-dimensional point cloud information; generate a first minimum bounding rectangle by performing a calculation to the first point and the first three-dimensional point cloud information using a ray method; and model the box according to the first minimum bounding rectangle and the box parameters; and a robot arm configured to pick the items to be picked according to the modeled box.

According to a fourth aspect of the present disclosure, there is provided an electronic device. The electronic device may include one or more processors; a memory for storing one or more programs; wherein, the processor is configured to perform the box modeling method according to any one of embodiments mentioned above.

According to a fifth aspect of the present disclosure, there is provided a computer-readable storage medium on which computer program is stored, and the computer program, when executed by a processor, implements any one of the above-mentioned box modeling method.

It is to be understood that both the foregoing general description and the following detailed description are exemplary and explanatory only and should not be taken as limiting the present disclosure.

BRIEF DESCRIPTION OF THE DRAWINGS

The accompanying drawings, which are incorporated in the specification and constitute a part of the specification, show the embodiments in compliance with the present disclosure, and are used to interpret the principle of the present disclosure together with the description. It is apparent that the drawings in the following description are only some embodiments of the present disclosure, from which, other drawings may be acquired by those ordinary skilled in the art without paying any creative labor.

DETAILED DESCRIPTION

Figure 1:
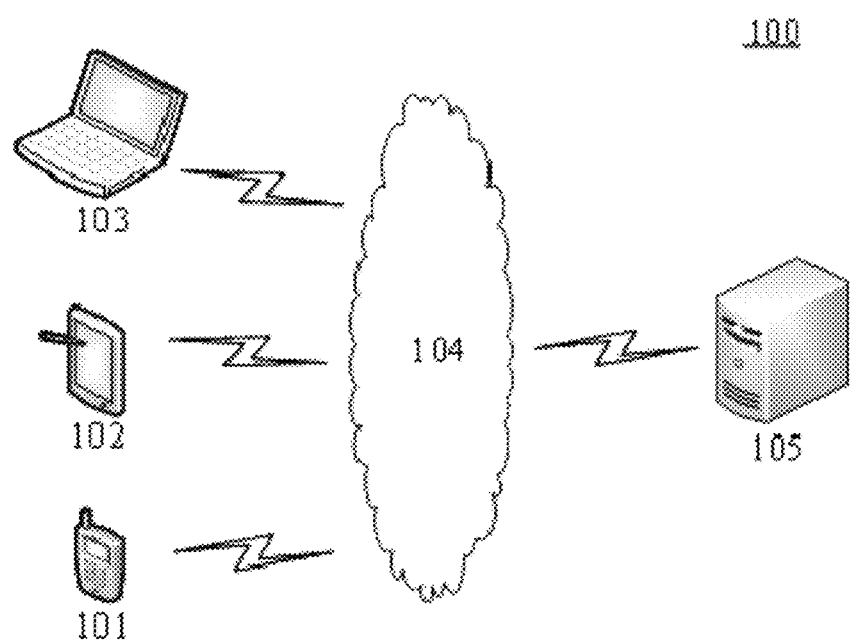
FIG. 1 is a system block diagram showing a box modeling method and apparatus thereof according to an exemplary embodiment.

Exemplary embodiments will now be described more fully with reference to the accompanying drawings. However, the exemplary embodiments may be embodied in many forms and should not be construed as limited to the examples set forth herein; rather, these embodiments are provided so that this disclosure will be more thorough and complete, and will fully convey the concept of the exemplary embodiments to those skilled in the art. In the drawings, the same reference numerals denote the same or similar parts, and thus their repeated description will be omitted.

The described features, structures, or characteristics may be combined in any suitable manner in one or more embodiments. In the following description, numerous specific details are given to provide a thorough understanding of embodiments of the present disclosure. Those skilled in the art will realize that the technical solutions of the present disclosure may be practiced without one or more of the specific details, or other methods, components, apparatus, steps, etc. may be utilized. In other instances, well-known technical solutions are not shown or described in detail to avoid obscuring respective aspects of the present disclosure.

In addition, the drawings are merely schematic representations of the present disclosure and are not necessarily drawn to scale. The same reference numerals in the drawings represent the same or similar parts, so the repeated description thereof will be omitted. Some of the block diagrams shown in the accompanying drawings are functional entities and do not necessarily correspond to physically or logically separate entities. These functional entities may be implemented in software form, or in one or more hardware modules or integrated circuits, or implemented in different networks and/or processor devices and/or microcontroller devices.

The flowchart shown in the drawings is only an exemplary description, and does not necessarily include all contents and steps, nor does it have to be executed in the described order. For example, some steps can be decomposed, and some steps can be combined or partially combined, so the actual execution order may be changed according to actual conditions.

The exemplary embodiments of the present disclosure will be described in detail below with reference to the accompanying drawings.

FIG. 1 is a system block diagram showing a box modeling method and apparatus thereof according to an exemplary embodiment.

As shown in FIG. 1, a system architecture 100 may include terminal devices 101, 102, 103, a network 104, and a server 105. The network 104 is a medium for providing communication links between the terminal devices 101, 102, 103 and the server 105. The network 104 may include various connection types, such as wired, wireless communication links, or fiber optic cables, and so on.

The server 105 may be a server that provides various services, such as a back-stage management server (just an example) that provides support for the box modeling system operated by a user using the terminal devices 101, 102, and 103. The back-stage management server can process, such as analyze and the like, data such as a received box modeling request, and so on, and feedback the processing results (such as, multiple equations of multiple faces, three-dimensional modeling results, only as an example) to the terminal device.

The server 105 can, for example, acquire first three-dimensional point cloud information of the box. For example, the server 105 can determine a first point of the box according to box parameters and the first three-dimensional point cloud information. The server 105 can, for example, use a ray method to process the first point and the first three-dimensional point cloud information, so as to generate a first minimum bounding rectangle. The server 105 may, for example, model the box according to the first minimum bounding rectangle and the box parameters.

The server 105 may be a physical server, or may be composed of multiple servers. For example, a part of the server 105 may be used as a box modeling task submission system in the present disclosure for acquiring box modeling tasks. Furthermore, a part of the server 105 can further be used as a box modeling system in the present disclosure, which is configured to acquire the first three-dimensional point cloud information of the box; determine the first point of the box according to the box parameters and the first three-dimensional point cloud information; use the ray method to process to the first point and the first three-dimensional point cloud information or make calculations based on the first point and the first three-dimensional point cloud information, so as to generate the first minimum bounding rectangle; and model the box according to the first minimum bounding rectangle and the box parameters.

It should be noted that the box modeling method provided by the embodiment of the present disclosure can be executed by the server 105, and accordingly, a box modeling apparatus can be set in the server 105. A requesting end provided to the user for submitting the box modeling task and obtaining the box modeling result is generally located in the terminal devices 101, 102, 103.

According to the box modeling method and apparatus of the present disclosure, the box can be accurately modeled so that a robot picking system can accurately identify the box.

Figure 2:
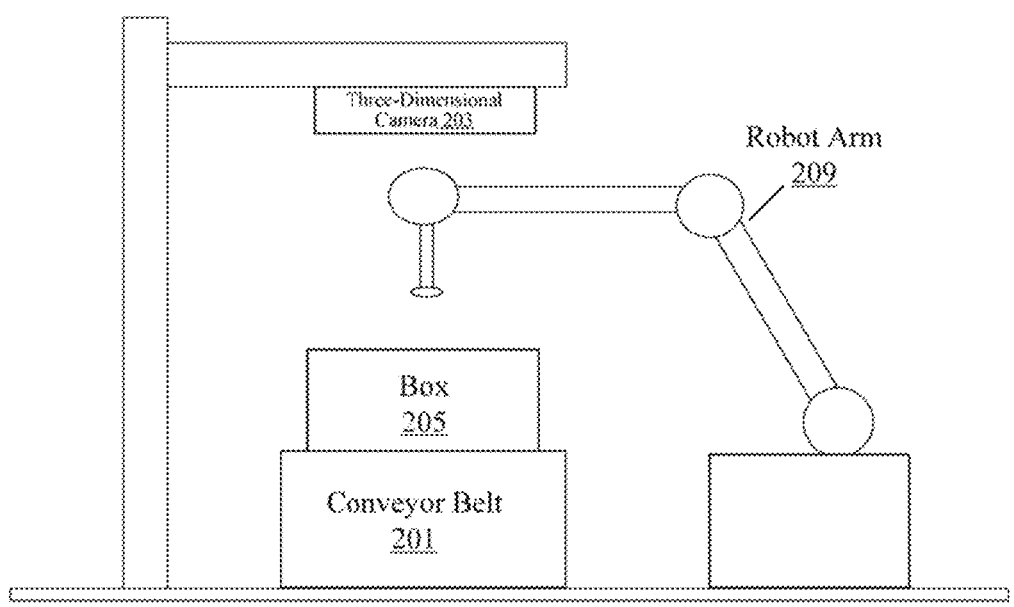
FIG. 2 is a schematic diagram showing a robot picking system according to an exemplary embodiment.

FIG. 2 is a schematic diagram showing a robot picking system according to an exemplary embodiment. As shown in FIG. 2, the robot picking system 20 at least includes: a conveyor belt 201, a three-dimensional camera 203, a box 205, a controller 207 (not shown), and a robot arm 209.

The conveyor belt 201 is used for conveying a target to be conveyed to a predetermined position.

The three-dimensional camera 203 is used for acquiring first three-dimensional point cloud information of the target to be conveyed at the predetermined position;

The box 205 is used for accommodating items to be picked.

The controller 207 (not shown) is configured to acquire the first three-dimensional point cloud information of the box; determine a first point of the box according to the box parameters and the first three-dimensional point cloud information; use the ray method to process the first point and the first three-dimensional point cloud information or make calculations based on the first point and the first three-dimensional point cloud information so as to generate a first minimum bounding rectangle; and model the box according to the first minimum bounding rectangle and the box parameters.

The robot arm 209 is used for picking the items to be picked according to the modeling of the box.

Figure 3:
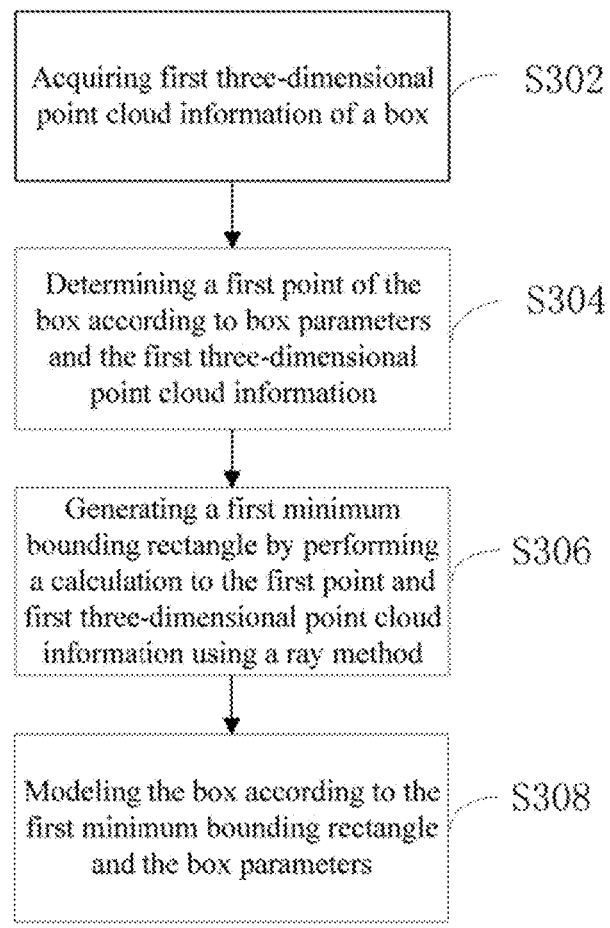
FIG. 3 is a flow chart showing a box modeling method according to an exemplary embodiment.

FIG. 3 is a flow chart showing a box modeling method according to an exemplary embodiment. The box modeling method of this embodiment can be used for the robot picking system. As shown in FIG. 3, the box modeling method 30 at least includes steps S302 to S308.

As shown in FIG. 3, in S302, the first three-dimensional point cloud information of the box is acquired. The box contains items to be picked, such as, but not limited to goods to be picked in a warehouse logistics production line. The first three-dimensional point cloud information is a set of point data about a surface appearance of a target object obtained by a measuring instrument, and the first three-dimensional point cloud information includes three-dimensional coordinates, color, and reflection intensity information, and so on.

In one embodiment, when it is determined that the box reaches the predetermined position, the first three-dimensional point cloud information of the box is acquired. The predetermined position is a position that the robot arm can reach, and said position may have a certain error range, so as to have a certain tolerance.

In one embodiment, the first three-dimensional point cloud information of the box is acquired by using a three-dimensional camera. The three-dimensional camera can be, for example, but not limited to, a binocular camera, a binocular video camera, and the like. Among them, the information obtained by the binocular video camera is video stream data, and the first three-dimensional point cloud information of the box is acquired by processing each frame of the video stream data.

Figure 4:
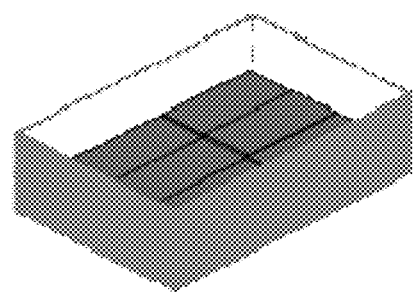
FIG. 4 is a schematic diagram showing a box according to an exemplary embodiment.

In one embodiment, the method further includes: acquiring third three-dimensional point cloud information of the box when the box is empty; determining fourth three-dimensional point cloud information at the bottom of the box according to the third three-dimensional point cloud information; and determining a plane equation about the bottom of the box according to the fourth three-dimensional point cloud information. The schematic diagram of the box is shown in FIG. 4, which contains the items to be picked. In this embodiment, the empty box is placed at the predetermined position, and the three-dimensional point cloud information of the empty box is acquired by the three-dimensional camera, which is named as third three-dimensional point cloud information. The third three-dimensional point cloud information includes distance information, and based on the distance information, the three-dimensional point cloud information at the bottom of the box, which is named as the fourth three-dimensional point cloud information, can be screened out from the third three-dimensional point cloud information.

In one embodiment, a random sampling consensus algorithm (RANSAC) and a least squares algorithm are used to process the fourth three-dimensional point cloud information to generate the plane equation about the bottom of the box. The random sampling consensus algorithm is an estimation method that estimates parameters of a mathematical model from a set of observed data containing outliers in an iterative manner. The least squares algorithm is also an estimation method, which finds a best function matching of data by minimizing a sum of squares of errors. The least squares algorithm can be used for curve fitting. Among them, according to coordinate information in the fourth three-dimensional point cloud information, the random sampling consensus algorithm or the least square algorithm can be used to estimate an equation of a plane in which the bottom of the box is located, so as to generate a plane equation of the bottom of the box.

In S304, the first point of the box is determined according to the box parameters and the first three-dimensional point cloud information. The box parameters at least include basic parameters the box, such as various dimensions of box. In this step, according to the height of the box, the point cloud data about the top of the box in the three-dimensional point cloud information can be screened out, and the first point can be determined from the point cloud data about the top of the box.

In one embodiment, based on the first three-dimensional point cloud information, the point cloud information about the top of the box is determined according to the plane equation and the box height, so as to acquire second three-dimensional point cloud information; a second minimum bounding rectangle of the box is calculated according to the second three-dimensional point cloud information; and the first point of the box is determined in the second minimum bounding rectangle. Among them, a plane equation of a plane in which the top of the box is located can be determined by the plane equation of the bottom of the box and the height of the box, and then point cloud information about the top of the box can be screened out from the first three-dimensional point cloud information based on the plane equation at the top of the box and can be named as second three-dimensional point cloud information. A minimum bounding rectangle of the second three-dimensional point cloud information can be calculated and can be named as the second minimum bounding rectangle. The first point is located in the second minimum bounding rectangle.

In one embodiment, a distance between the first point and a center point of the second minimum bounding rectangle is within a threshold range. Wherein, the first point may be the center point of the second minimum bounding rectangle, or any point whose distance from the center point is within the threshold range, which is not specifically limited in the present disclosure.

In S306, the first minimum bounding rectangle is generated by processing the first point and the first three-dimensional point cloud information using the ray method. As shown in FIG. 4, the box is used in warehouse logistics, and the top of the box is usually fully opened, so that the items can be picked up. At the same time, the box always has a certain thickness, and the first minimum bounding rectangle is obtained according to the three-dimensional point cloud information about an inner wall of the top of the box. As mentioned above, the second minimum bounding rectangle is obtained based on the first three-dimensional point cloud information about an outer wall of the top of the box. In the ray method, the first point can be used as a starting point to make a ray to determine whether any point is in a region.

In one embodiment, the ray method is used to process the first point and the second three-dimensional point cloud information or make calculations based on the first point and the second three-dimensional point cloud information, so as to determine an inner edge of the box and then calculate a minimum bounding rectangle of the inner edge to generate the first minimum bounding rectangle. Wherein, the second three-dimensional point cloud information is a part of the first three-dimensional point cloud information which reflecting the information at the top of the box. As mentioned above, it can be seen that the first minimum bounding rectangle and the second minimum bounding rectangle are located in the same plane, and the obtained first minimum bounding rectangle is usually located in the second minimum bounding rectangle. Since the first point is in the second minimum bounding rectangle and is close to the center point of the second minimum bounding rectangle, the first point is usually also located in the first minimum bounding rectangle. Among them, a Backward Pass can be used to obtain a specific position of a region (that is, the first minimum bounding rectangle), that is, the first point as a starting point, using the ray method in a reverse way, and then the first minimum bounding rectangle can be obtained by all points in the region (including the points contained in the second three-dimensional point cloud information).

In S308, the box is modeled according to the first minimum bounding rectangle and the box parameters. Among them, the box parameters include the size and thickness of the box, and equations for each face of the box can be calculated separately according to the first minimum bounding rectangle.

In one embodiment, multiple plane equations respectively corresponding to multiple faces of the box are determined according to the first minimum bounding rectangle and the box parameters; and the box is modeled according to the multiple plane equations. For example, parametric equation of the plane where the bottom of the box is located is determined by a downward translation of the first minimum bounding rectangle by a displacement equaling to the height of the box. For another example, equations of the plane where the side walls of the box are located are determined according to the first minimum bounding rectangle and the thickness of the box. Further, as shown in FIG. 4, the box body has 5 outer faces, 5 inner faces and a face where a virtual opening is located, and a box body may have 11 faces.

According to the box modeling method of the present disclosure, a first point in the second minimum bounding rectangle is initially obtained, and the first minimum bounding rectangle of the box body is obtained by making an iterative calculation based on the first point using the ray method, and then the box body is modeled according to the first minimum bounding rectangle. By using the box modeling method of the present disclosure, the box body can be modeled accurately, so that the robot picking system can accurately identify the box.

According to the box modeling method of the present disclosure, the first minimum bounding rectangle is obtained by the ray method, and the box body is modeled according to the first minimum bounding rectangle, which solves the problem of too large box size obtained in the prior art. Compared with the box model established according to the second minimum bounding rectangle in the prior art, it has higher accuracy.

It should be clearly understood that the present disclosure describes how to form and use specific examples, but the principles of the present disclosure are not limited to any details of these examples. On the contrary, based on the teaching of the contents of the present disclosure, these principles can be applied to many other embodiments.

Figure 5:
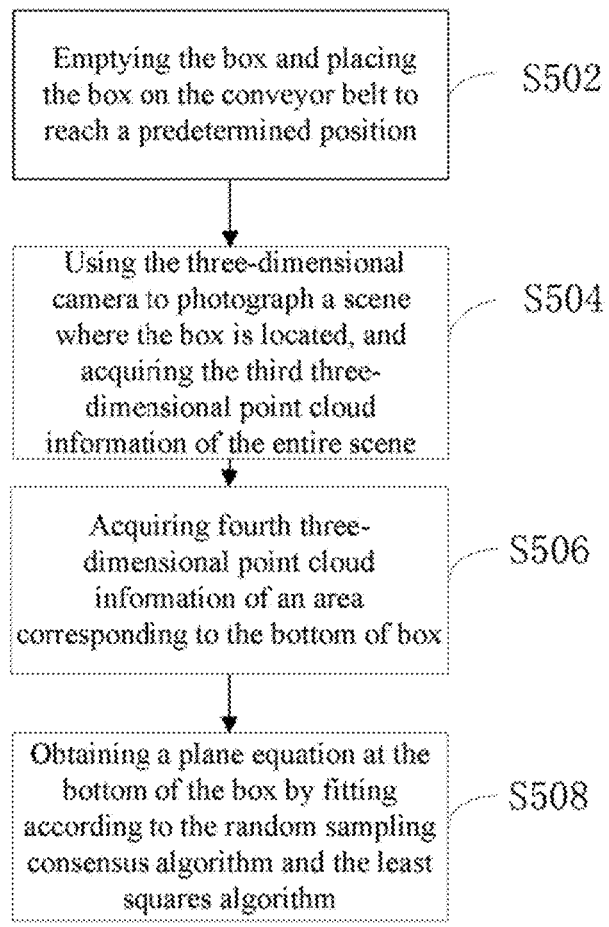
FIG. 5 is a flow chart showing a box modeling method according to another exemplary embodiment.

FIG. 5 is a flow chart showing a box modeling method according to another exemplary embodiment. The box modeling method of this embodiment can be executed before step S302, and the box modeling method 50 at least includes steps S502 to S508.

As shown in FIG. 5, in S502, the box is emptied and placed on the conveyor belt to reach a predetermined position. The predetermined position is a position that can be captured by the 3D camera. Furthermore, as shown in FIG. 2, the 3D camera is disposed at the top of the conveyor belt, and the predetermined position is located within the range between the conveyor belt and the 3D camera.

In S504, the three-dimensional camera is used to photograph a scene where the box is located, and the third three-dimensional point cloud information of the entire scene is acquired. Since the box is empty, the acquired third 3D point cloud information contains 3D point cloud information at the bottom of the box.

In S506, the 3D point cloud information of an area corresponding to the bottom of the box, which is called as fourth three-dimensional point cloud information, is acquired, wherein, the third three-dimensional point cloud information in S504 can be screened out according to box parameters, such as the height of the box, to obtain the fourth three-dimensional point cloud information of the area corresponding to the bottom of the box.

In S508, a plane equation at the bottom of the box is obtained by fitting according to the random sampling consensus algorithm and the least squares algorithm. The random sampling consensus algorithm and the least squares algorithm have been introduced in the foregoing, and will not be repeated here.

Figure 6:
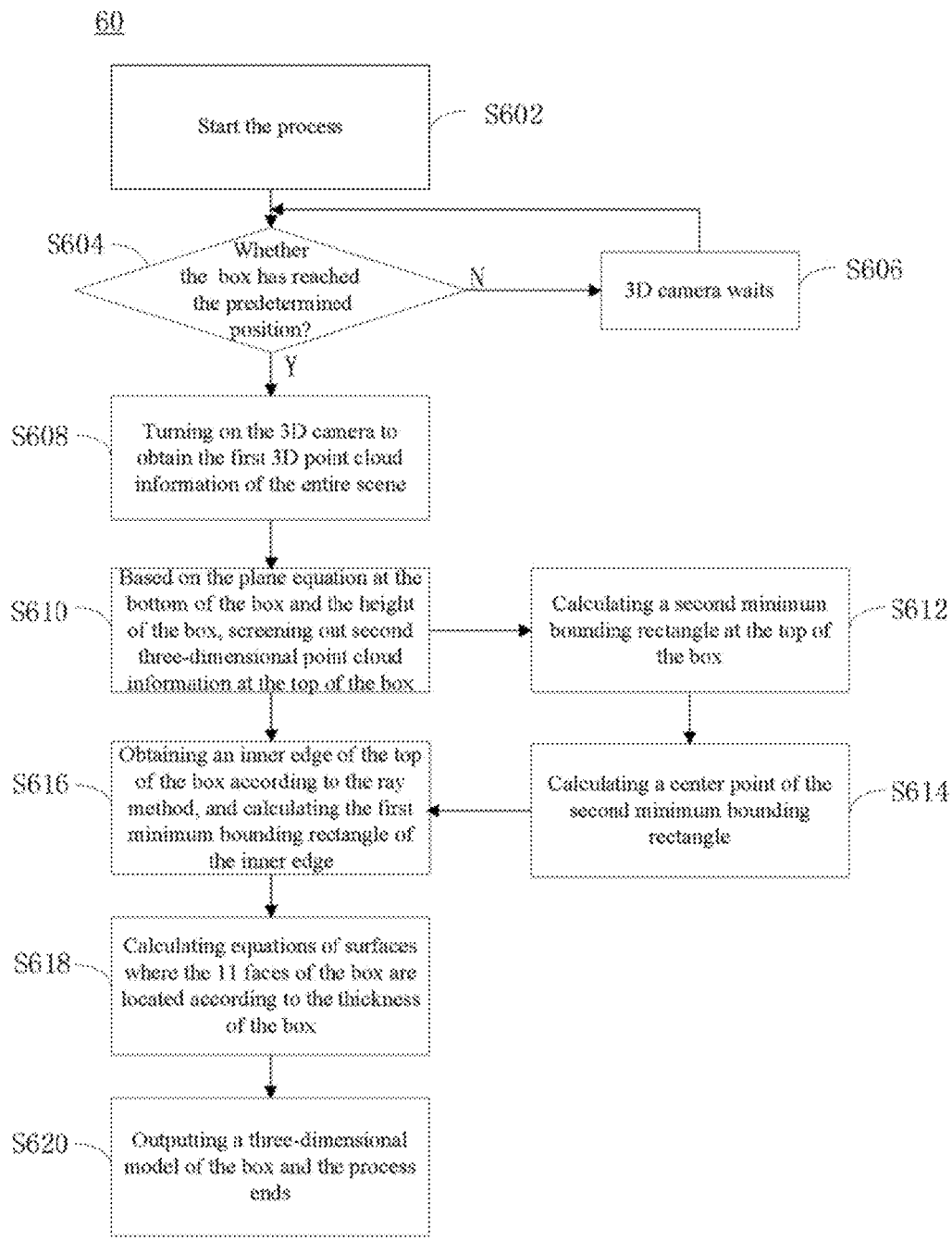
FIG. 6 is a flow chart showing a box modeling method according to yet another exemplary embodiment.

FIG. 6 is a flow chart showing a box modeling method according to yet another exemplary embodiment. The box modeling method 60 at least includes steps S602 to S608.

As shown in FIG. 6, in S602, the process is started.

In S604, it is determined whether the turnover box has reached the predetermined position. If the turnover box has reached the predetermined position, go to S608. If the turnover box has not reached the predetermined position, go to S606.

In S606, the 3D camera waits for the turnover box and returns to execute S604.

In S608, the 3D camera is turned on to obtain the first 3D point cloud information of the entire scene.

In S610, second three-dimensional point cloud information at the top of the box is screened out according to the plane equation at the bottom of the box and the height of the box. Among them, a plane equation at the top of the box can be determined according to the plane equation at the bottom of the box and the height of the box, and point cloud information at the top of the box can be screened out according to the plane equation at the top of the box.

In S612, a second minimum bounding rectangle at the top of the box is calculated.

In S614, a center point of the second minimum bounding rectangle is calculated. Among them, it can also be any point within a threshold range from the center point, and is not limited to the center point.

In S616, an inner edge of the top of the box is obtained according to the ray method, and the first minimum bounding rectangle of the inner edge is calculated. The ray method uses the center point as a point in the first minimum bounding rectangle to make rays. Multiple rays intersect with multiple points in the area where the top of the box is located. The first minimum bounding rectangle is obtained by determining that all intersecting points with the top area of the box are outside of the first minimum bounding rectangle and the number of intersect points with the first minimum bounding rectangle are an odd number.

In S618, equations of surfaces where the 11 faces of the box are located are calculated according to the thickness of the box.

In S620, a three-dimensional model of the box is output, and the process ends.

Figure 7:
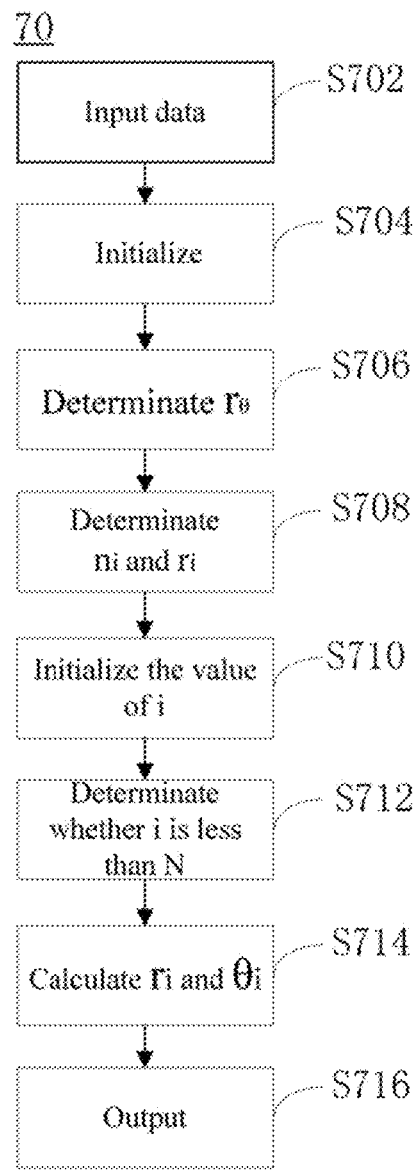
FIG. 7 is a flow chart showing a box modeling method according to yet another exemplary embodiment.

FIG. 7 is a flow chart showing a box modeling method according to yet another exemplary embodiment. The box modeling method 70 describes the process of generating the first minimum bounding rectangle according to the ray method. As shown in FIG. 7, the box modeling method 70 at least includes S702 to S716.

In S702, a binary image I formed by the point cloud at the top of the box, the center point C of the top area, a point number threshold $T_1$ on the ray, a point number threshold $T_2$ of a fan-shaped area, and the discretization number N of angle of circumference are input.

In S704, $r_i$ and $n_i$ are initialized, wherein $r_i = +\infty$, $n_i = 0$, $i = 1, \ldots, N$, $S = \emptyset$.

In S706, for each white point (x, y) of the binary image I, let $$\theta = \text{mod}\left(\left\lfloor \frac{1}{2} + \frac{N}{2\pi}(a\tan2(y - y_C, x - x_C) + 2\pi) \right\rfloor, N\right)$$

$n_\theta = n_\theta + 1,$

If $r_\theta > \sqrt{(x - x_C)^2 + (y - y_C)^2}$, then let $r_\theta > \sqrt{(x - x_C)^2 + (y - y_C)^2}$ In S708, for $i = 1, \ldots, N$, if $n_i \leq T_2$, set $n_i = 0$ and $r_i = +\infty$.
In S710, set $i = 1$.
In S712, if $i < N$, go to the next step, otherwise go to step S716.
In S714, let $$i_{min} = \min_{j \geq i}\left\{ j \,\middle|\, \sum_{k=i}^{j} n_{mod(k-1,N)+1} \geq T_2 \right\},$$

$$r_{min} = \min_{i \leq k \leq i_{min}} r_k, \, \theta_{min} = \underset{i \leq k \leq i_{min}}{\arg\min} \, r_k,$$

$S = S \cup \{(\lfloor x_C + r_{min} \cos\theta_{min} \rfloor, \lfloor y_C + r_{min} \sin\theta_{min} \rfloor)\}$
Let $i = i + 1$. Go to step S612.

In S716, the first minimum bounding rectangle S about the inner edge of the top of the box is output, and the process ends.

Figure 8:
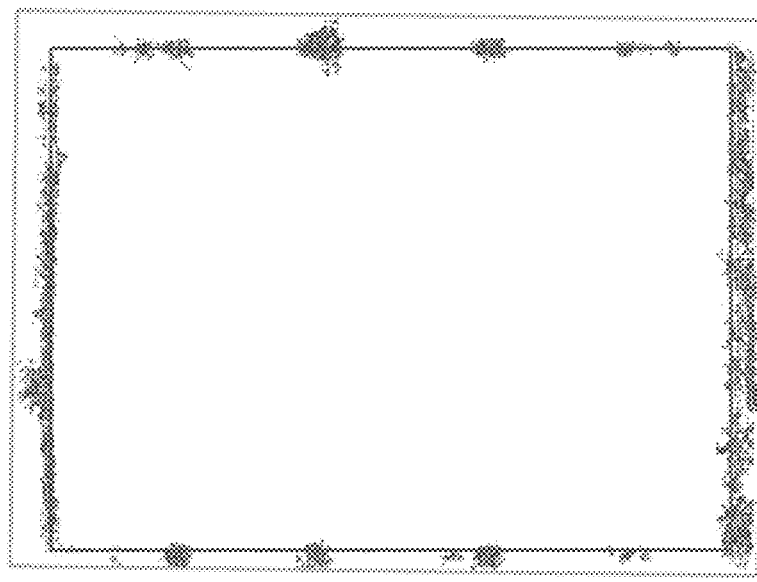
FIG. 8 is a diagram of a running result of a box modeling method shown in FIG. 7.

The running result of the box modeling method 70 is shown in FIG. 8. The outer rectangular box is the second minimum bounding rectangle, the inter rectangular box is the first minimum bounding rectangle, and the points between the two rectangular boxes is the three-dimensional point cloud information about the top of the box.

According to the box modeling method of the present disclosure, the inner center point is obtained by calculating the minimum bounding rectangle of the top of the box based on the point cloud at the top of the box, and then the inner edge of the point cloud at the top of the box is determined by the ray method, and then the minimum bounding rectangle of the inner edge is calculated to more accurately obtain the inner edge rectangle of the box body, which can provide more accurate preparation data for box modeling.

According to the box modeling method of the present disclosure, the plane equations of multiple faces of the box are obtained by the minimum bounding rectangle about the inner edge of the box, so as to establish a three-dimensional model of the box, which can solve the problem of the oversized geometric of the box obtained in the prior art.

Those skilled in the art can understand that all or part of the steps for implementing the above-mentioned embodiments are implemented as a computer program executed by a CPU. When the computer program is executed by the CPU, it executes the above-mentioned functions defined by the above-mentioned method provided in the present disclosure. The program can be stored in a computer-readable storage medium, which can be a read-only memory, a magnetic disk, or an optical disk.

In addition, it should be noted that the above-mentioned drawings are merely schematic illustrations of the process included in the method according to the exemplary embodiments of the present disclosure, and are not intended for limitation. It is easy to understand that the processes shown in the above drawings does not indicate or limit the time sequence of these processes. In addition, it is easy to understand that these processes can be executed synchronously or asynchronously in multiple modules, for example.

The following are an apparatus embodiment of the present disclosure, which can be used to implement the method embodiments of the present disclosure. For details that are not disclosed in the apparatus embodiment of the present disclosure, refer to the method embodiments of the present disclosure.

Figure 9:
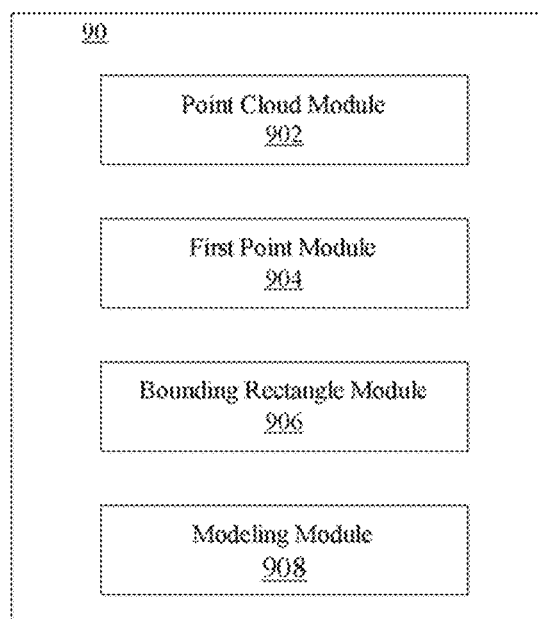
FIG. 9 is a block diagram showing a box modeling apparatus according to an exemplary embodiment.

FIG. 9 is a block diagram showing a box modeling apparatus according to an exemplary embodiment. Referring to FIG. 9, the box modeling apparatus 90 at least includes: a point cloud module 902, a first point module 904, a bounding rectangle module 906, and a modeling module 908.

In the box modeling apparatus 90, the point cloud module 902 is configured to acquiring the first three-dimensional point cloud information of the box. The box contains items to be picked, such as, but not limited to goods to be picked in a warehouse logistics production line. The first three-dimensional point cloud information is a set of point data about a surface appearance of a target object obtained by a measuring instrument, and the first three-dimensional point cloud information includes three-dimensional coordinates, color, and reflection intensity information, and so on.

In one embodiment, the point cloud module 902 is configured to acquire the first three-dimensional point cloud information of the box when it is determined that the box has reached a predetermined position. The predetermined position is a position that the robot arm can reach, and said position may have a certain error range, so as to have a certain tolerance.

In one embodiment, the point cloud module 902 is configured to acquire the first three-dimensional point cloud information of the box by using a three-dimensional camera.

In one embodiment, the point cloud module 902 is further configured to acquire third three-dimensional point cloud information of the box when the box is empty; determine fourth three-dimensional point cloud information at the bottom of the box according to the third three-dimensional point cloud information; and determine a plane equation about the bottom of the box according to the fourth three-dimensional point cloud information.

In one embodiment, the point cloud module 902 is configured to generate a plane equation at the bottom of the box by processing the fourth three-dimensional point cloud information using a random sampling consensus algorithm and a least squares algorithm.

The first point module 904 is configured to determine a first point of the box according to the box parameters and the first three-dimensional point cloud information. In the first point module 904, according to the height of the box, the point cloud data about the top of the box in the three-dimensional point cloud information can be screened out, and the first point can be determined from the point cloud data about the top of the box.

In one embodiment, the first point module 904 is configured to: acquire second three-dimensional point cloud information by, based on the first three-dimensional point cloud information, determining the top point cloud information of the box according to the plane equation of the bottom of the box and the height of the box; calculate the second minimum bounding rectangle of the box according to the second three-dimensional point cloud information; and determine the first point of the box in the second minimum bounding rectangle.

In one embodiment, the distance between the first point and the center point of the second minimum bounding rectangle is within a threshold range.

The bounding rectangle module 906 is configured to generate the first minimum bounding rectangle by performing a calculation to the first point and the first three-dimensional point cloud information using the ray method. As shown in FIG. 4, the box is used in warehouse logistics, and the top of the box is usually fully opened, so that the items can be picked up. At the same time, the box always has a certain thickness, and the first minimum bounding rectangle is obtained according to the three-dimensional point cloud information about an inner wall of the top of the box.

In one embodiment, the bounding rectangle module 906 is configured to performing a calculation to the first point and the second three-dimensional point cloud information using the ray method, so as to determine an inner edge of the box, and then calculate a minimum bounding rectangle of the inner edge to generate the first minimum bounding rectangle.

The modeling module 908 is configured to model the box according to the first minimum bounding rectangle and box parameters. Among them, the box parameters include the size and thickness of the box, and equations for each face of the box can be calculated separately according to the first minimum bounding rectangle.

According to the box modeling apparatus of the present disclosure, the first minimum bounding rectangle is obtained by the ray method, and the box is modeled according to the first minimum bounding rectangle, which solves the problem that the box size obtained in the prior art is too large. Compared with the model established according to the second minimum bounding rectangle in the prior art, it has higher accuracy.

Figure 10:
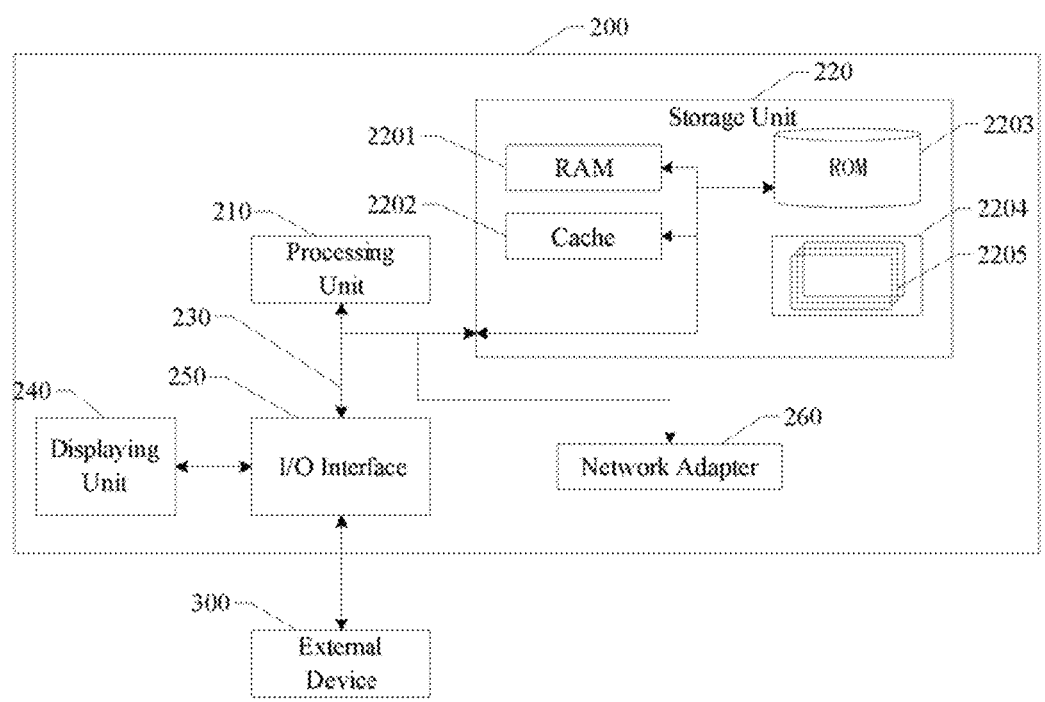
FIG. 10 is a block diagram showing electronic equipment according to an exemplary embodiment.

FIG. 10 is a block diagram showing an electronic device according to an exemplary embodiment.

The electronic device 200 according to this embodiment of the present disclosure will be described below with reference to FIG. 10. The electronic device 200 shown in FIG. 10 is only an example, and should not bring any limitation to the function and scope of use of the embodiments of the present disclosure.

As shown in FIG. 10, the electronic device 200 is represented in the form of a general-purpose computing device. The components of the electronic device 200 may comprise, but are not limited to, at least one processing unit 210, at least one storage unit 220, a bus 230 connecting different system components (including the storage unit 220 and the processing unit 210), a display unit 240 and so on.

In the example above, the storage unit stores program codes, and the program codes may be executed by the processing unit 210, so that the processing unit 210 executes various steps of the exemplary embodiments according to the present invention described in the above-mentioned 'exemplary method' in the specification. For example, the processing unit 210 may perform the above steps in FIG. 3, FIG. 5, FIG. 6, and FIG. 7.

The storage unit 220 may comprise a readable medium in the form of a volatile storage unit, such as a random access storage unit (RAM) 2201 and/or a cache storage unit 2202, and may further comprise a read-only storage unit (ROM) 2203.

The storage unit 220 may further comprise a program/utility tool 2204 having a set of (at least one) program modules 2205. Such program modules 2205 comprise, but are not limited to, an operating system, one or more application programs, other program modules, and program data. Each or some combination of these examples may comprise an implementation of a network environment.

The bus 230 may be one or more of several types representing bus structures, comprising a storage unit bus or a storage unit controller, a peripheral bus, a graphics acceleration port, a processing unit, or a local bus that uses any bus structure in a variety of bus structures.

The electronic device 200 may also communicate with one or more external devices 300 (such as a keyboard, pointing device, Bluetooth device, etc.), may also communicate with one or more devices that enable a user to interact with the electronic device 200, and/or with any device (e.g., router, modem, etc.) that enables the electronic device 200 to communicate with one or more other computing devices. This communication may be performed through an input/output (I/O) interface 250. Moreover, the electronic device 200 may also communicate with one or more networks (such as a local area network (LAN), a wide area network (WAN), and/or a public network, such as the Internet) through the network adapter 260. As shown, the network adapter 260 communicates with other modules of the electronic device 200 through the bus 230. It should be understood that although not shown in the figure, other hardware and/or software modules may be used in conjunction with the electronic device 200, comprising but not limited to: microcode, device drivers, redundant processing units, external disk drive arrays, RAID systems, tape drives, data backup storage systems and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

Figure 11:
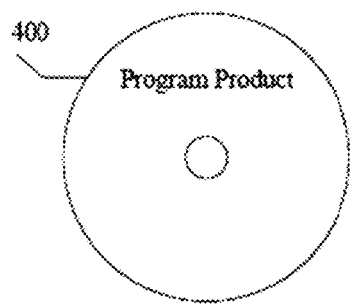
FIG. 11 schematically shows a schematic diagram of a computer-readable storage medium in an exemplary embodiment of the present disclosure.

FIG. 11 schematically shows a schematic diagram of a computer-readable storage medium in an exemplary embodiment of the present disclosure.

Referring to FIG. 11, a program product 400 for implementing the above method according to an embodiment of the present invention is described. The program product 400 can use a portable compact disc read-only memory (CD-ROM) and include the program code, which may run on a terminal device, for example, personal computer. However, the program product of the present invention is not limited thereto. In this document, the readable storage medium may be tangible medium containing or storing program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media comprise: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may comprise a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device. The program code contained on the readable medium may be transmitted using any appropriate medium, comprising but not limited to wireless, wired, optical cable, RF, etc., or any suitable combination of the foregoing.

The program code for performing the operations of the present invention may be written in any combination of one or more programming languages, which comprise object-oriented programming languages, such as Java, C++, etc. and further comprise conventional procedural programming language, such as 'C' or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

The above-mentioned computer-readable medium carries one or more programs. When the above-mentioned one or more programs are executed by a device, the computer-readable medium realizes the following functions: acquiring first three-dimensional point cloud information of a box; determining a first point of the box according to box parameters and the first three-dimensional point cloud information; generating a first minimum bounding rectangle by processing the first point and the first three-dimensional point cloud information using a ray method; and modeling the box according to the first minimum bounding rectangle and the box parameters.

Those skilled in the art can understand that the above-mentioned modules can be distributed in the device according to the description of the embodiment, or corresponding changes can be made in one or more devices that are uniquely different from this embodiment. The modules in the above-mentioned embodiments can be combined into one module or further divided into multiple sub-modules.

Through the description of the above embodiments, those skilled in the art can easily understand that the exemplary embodiments described here can be implemented by software, or can be implemented by combining software with necessary hardware. Therefore, the technical solution according to the embodiments of the present disclosure can be embodied in the form of a software product, and the software product can be stored in a non-volatile storage medium (which can be a CD-ROM, USB disk, mobile hard disk, etc.) or on the network, and includes several instructions to make a computing device (which may be a personal computer, a server, a mobile terminal, or a network device, etc.) execute the method according to the embodiments of the present disclosure.

The exemplary embodiments of the present disclosure have been specifically shown and described above. It should be understood that the present disclosure is not limited to the detailed structure, arrangement or implementation method described herein; on the contrary, the present disclosure intends to cover various modifications and equivalent arrangements included in the spirit and scope of the appended claims.

What is claimed is:

1. A box modeling method, which is applied in a robot picking system, comprising:
   acquiring first three-dimensional point cloud information of a box;
   determining a first point of the box according to box parameters and the first three-dimensional point cloud information;
   generating a first minimum bounding rectangle by performing a calculation to the first point and the first three-dimensional point cloud information using a ray method; and
   modeling the box according to the first minimum bounding rectangle and the box parameters,
   wherein said determining the first point of the box according to the box parameters and the first three-dimensional point cloud information comprises:
      based on the first three-dimensional point cloud information, determining second three-dimensional point cloud information at the top of the box according to a plane equation at the bottom of the box and a height of the box, wherein determining the second three-dimensional point cloud information comprises: determining a plane equation at top of the box based on the plane equation at the bottom of the box and the height of the box, and screening, based on the plane equation at the top of the box, point cloud information about the top of the box out from the first three-dimensional point cloud information as the second three-dimensional point cloud information;
      calculating a second minimum bounding rectangle of the box according to the second three-dimensional point cloud information; and
      determining a first point of the box in the second minimum bounding rectangle,
   wherein the method further comprises:
      acquiring third three-dimensional point cloud information of the box in the case of the box is empty;
      determining fourth three-dimensional point cloud information at the bottom of the box according to the third three-dimensional point cloud information; and
      determining the plane equation at the bottom of the box according to the fourth three-dimensional point cloud information.

2. The method of claim 1, wherein said determining the plane equation at the bottom of the box according to the fourth three-dimensional point cloud information comprises:
   generating the plane equation at the bottom of the box by performing a calculation to the fourth three-dimensional point cloud information using a random sampling consensus algorithm and a least squares algorithm.

3. The method of claim 1, wherein a distance between the first point and a center point of the second minimum bounding rectangle is within a threshold range.

4. The method of claim 1, wherein said generating a first minimum bounding rectangle by performing the calculation to the first point and the first three-dimensional point cloud information using a ray method comprises:
   determining an inner edge of the box by performing a calculation to the first point and the second three-dimensional point cloud information using the ray method; and
   generating the first minimum bounding rectangle by calculating a minimum bounding rectangle of the inner edge.

5. The method of claim 1, wherein modeling the box according to the first minimum bounding rectangle and the box parameters comprises:
   determining a plurality of plane equations respectively corresponding to a plurality of faces of the box according to the first minimum bounding rectangle and the box parameters; and
   modeling the box according to the plurality of plane equations.

6. The method of claim 1, wherein said acquiring first three-dimensional point cloud information of the box comprises:
   acquiring the first three-dimensional point cloud information of the box, when it is determined that the box reaches a predetermined position.

7. The method of claim 1, wherein said acquiring the first three-dimensional point cloud information of the box comprises:
   acquiring the first three-dimensional point cloud information of the box using a three-dimensional camera.

8. An electronic device, which is applied in a robot picking system, comprising:
   one or more processors;
   a memory for storing one or more programs;
   wherein, the processor is configured to:
   acquire first three-dimensional point cloud information of a box;
   determine a first point of the box according to box parameters and the first three-dimensional point cloud information;
   generate a first minimum bounding rectangle by performing a calculation to the first point and the first three-dimensional point cloud information using a ray method; and
   model the box according to the first minimum bounding rectangle and the box parameters,
   wherein the processor is configured to:
      based on the first three-dimensional point cloud information, determine second three-dimensional point cloud information at the top of the box according to a plane equation at the bottom of the box and a height of the box, wherein determine the second three-dimensional point cloud information comprises:
determining a plane equation at top of the box based on the plane equation at the bottom of the box and the height of the box, and screening, based on the plane equation at the top of the box, point cloud information about the top of the box out from the first three-dimensional point cloud information as the second three-dimensional point cloud information;
calculate a second minimum bounding rectangle of the box according to the second three-dimensional point cloud information; and
determine a first point of the box in the second minimum bounding rectangle,
wherein the processor is further configured to:
acquire third three-dimensional point cloud information of the box in the case of the box is empty;
determine fourth three-dimensional point cloud information at the bottom of the box according to the third three-dimensional point cloud information; and
determine the plane equation at the bottom of the box according to the fourth three-dimensional point cloud information.

9. The electronic device of claim 8, wherein the processor is configured to:
generate the plane equation at the bottom of the box by performing a calculation to the fourth three-dimensional point cloud information using a random sampling consensus algorithm and a least squares algorithm.

10. The electronic device of claim 8, wherein a distance between the first point and a center point of the second minimum bounding rectangle is within a threshold range.

11. The electronic device of claim 8, wherein the processor is configured to:
determine an inner edge of the box by performing a calculation to the first point and the second three-dimensional point cloud information using the ray method; and
generate the first minimum bounding rectangle by calculating a minimum bounding rectangle of the inner edge.

12. The electronic device of claim 8, wherein the processor is configured to:
determine a plurality of plane equations respectively corresponding to a plurality of faces of the box according to the first minimum bounding rectangle and the box parameters; and
model the box according to the plurality of plane equations.

13. The electronic device of claim 8, wherein the processor is configured to:
acquire the first three-dimensional point cloud information of the box, when it is determined that the box reaches a predetermined position.

14. The electronic device of claim 8, wherein the processor is configured to:
acquire the first three-dimensional point cloud information of the box using a three-dimensional camera.

\* \* \* \* \*